United States Patent

[11] 3,595,977

[72] Inventor: Bruno Orlando, Milan, Italy
[21] Appl. No: 859,428
[22] Filed: Sept. 19, 1969
[45] Patented: July 27, 1971
[73] Assignee: Kinglor, Finanz-und Beratungsanstalt, Eschen, Liechtenstein
[32] Priority: Nov. 28, 1968
[33] Switzerland
[31] 17,784/68

[54] SELF-BAKING ELECTRODES FOR ELECTRIC ARC FURNACES
4 Claims, 4 Drawing Figs.

[52] U.S. Cl. .................................................. 13/18
[51] Int. Cl. ............................................. H05b 7/06
[50] Field of Search ........................... 13/18, 18 SOD

[56] References Cited
UNITED STATES PATENTS
2,666,087   1/1954   Johansson et al   13/18 (SOD)
3,365,533   1/1968   Alexander         13/18 (SOD)

Primary Examiner—Bernard A. Gilheany
Assistant Examiner—R. N. Envall, Jr.
Attorney—Anderson, Luedeka, Fitch, Even and Tabin ABSTRACT: A self-baking electrode of the Söderberg type for electric arc furnaces comprises an outer metal sleeve containing the electrode mixture and internal reinforcing members for the electrode mixture, said reinforcing or structural members being electrically insulated from the outer metallic sleeve. The internal wall of the sleeve preferably is provided with radial ribs extending the whole length of the sleeve and the reinforcing members are attached to the ribs by means of insulating strips.

PATENTED JUL 27 1971  3,595,977

SELF-BAKING ELECTRODES FOR ELECTRIC ARC FURNACES

The present invention quite generally refers to an electrode and more specifically to a self-baking or Söderberg-type electrode for electric arc furnaces, particularly for submerged arc furnaces.

The known electrodes of the type referred to, particularly those for electric submerged arc furnaces for the production of ferroalloys, calcium carbide, silicon, electrofused oxides, typically consist of a metallic sleeve, such as a cylindrical sleeve, which is filled with a crude or green carbonaceous electrode mass. These electrodes are vertically positioned above the crucible of the furnace proper and their lower portions are exposed to the high temperature within the crucible. Because of this high temperature, the green electrode mass is subjected to a baking process which transforms said green mass into a solid carbonaceous body which is highly refractory and has a relatively high electrical conductivity. The baked portion of the electrode mass acquires the shape of the shell, whereas the latter is continuously melting away owing to the high temperatures in the baking region of the electrode.

In a self-baking electrode there are consequently, as seen from their bottom end upwardly, a solid portion with a relatively high electrical conductivity and having temperatures ranging between over 2,000° C. and about 800° C.; this solid portion being followed at its upper end by a baking zone in which the baking process is taking place, i.e. in which the electrode mass is semifluid and, therefore, a poor conductor, the temperatures in this baking zone ranging from approximately 800° C. to 300° C. In the zone above said baking zone there is a zone in which the electrode mass is fluid, said zone having temperatures ranging from about 300° C. to 100° C., and in which the electrode mass does not conduct electricity.

Finally, in the uppermost portion of the electrode there is a zone in which the electrode mass is particulate and has temperatures below about 100° C. and in which, of course, the electrode mass is not a conductor of electric energy.

The supply of electricity to the electrode is effected by metallic conductors such as bus bars which contact the electrode shell between the solid zone or portion and the baking zone of the electrode. These conductors generally consist of buses of copper or bronze having a large contact surface and are generally thoroughly cooled in order to withstand the high temperatures in this zone. Because of this thorough cooling of the buses and of their contact surfaces respectively, the electrode temperature in the contact zone is also limited, and consequently the baking zone of the electrode is prevented from passing the contact zone.

However, the metallic sleeve and the electrode mass being the only components of the electrode assembly, same has, therefore, to be reinforced inside the sleeve by supporting structural members. In fact, the weight of the solid baked portion of the electrode and of the electrode mass lying on it may not be totally supported by the buses and, if no other supporting means are provided, the solid portion and the electrode mass lying on it often fall by their own weight into the crucible of the furnace.

The present invention will be described hereinafter in connection with the accompanying drawing in which.

Figure 1:
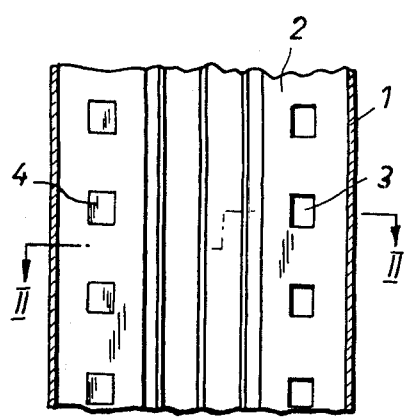
FIG. 1 is a partial sectional view taken axially along the length of a prior art electrode with the electrode mass having been omitted for the purpose of clarity.
Figure 2:
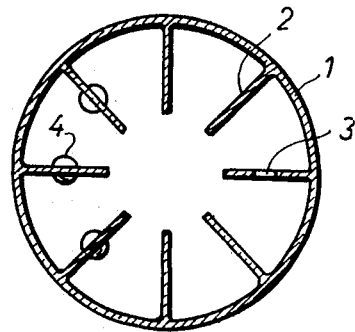
FIG. 2 is a cross-sectional view taken along line II–II of FIG. 1.

According to a known practice, the supporting structural members inside the sleeve consist in metallic strips or vanes 2 which are welded to the inside wall of the sleeve 1 in radial position as shown in FIGS. 1 and 2 of the drawings. These strips or wings 2 comprise openings 3 or beads 4 for anchoring the baked electrode mass. Therefore, the weight of the baked solid portion and of the electrode mass lying on it is supported by these strips or wings 2, which transfer the weight to the metallic sleeve, which in turn is carried by suitable carrying or supporting means.

There are several patents describing particular designs of supporting structural members for self-baking electrodes. Some of these known designs are particularly adapted for electrodes for the production of aluminum: the electrode weight is carried by metal bars embedded in the electrode, said bars also serving to supply electric power. This known design is not suitable for self-baking electrodes for electric arc furnaces because of the different operating conditions (such as temperatures, stresses, density of electric current, power density) and also because electric arc furnaces usually operate on AC power and the length of the embedded bars would cause an undesired and harmful increase of electrode impedance.

Other known designs show particular shapes of the shell or of the structural members associated therewith, but these designs have other objects than those of the present invention.

During its operation in the furnace, the electrode is consumed, i.e. more specifically is consumed at its lowermost portion. It is therefore necessary to lower periodically the electrode relative to the buses to maintain the electrode length below the zone of contact of said buses. As stated above, the buses are connected to the electrodes between the baked zone (i.e. conducting zone) and baking zone (i.e. nonconducting zone) of the electrode mass. When the electrode is appreciably lowered relative to the buses to compensate for wear by consumption, it may occur that the lowered electrode mass is not yet a conductor or is a poor conductor. In such cases, the major portion of the power supplied to the electrode by the buses has to pass the metallic sleeve, from which it passes to the structural members (which constitute the supporting elements), and finally passes from the structural members to the baked zone of the electrode. If now the structural members do not have a sufficiently large cross-sectional area to support the high-current densities, they will become red hot because of the Joule effect, thus losing their mechanical strength and becoming unable to support any longer the electrode weight, and consequently causing breakage or failure of the electrode.

Failure of the type described is a frequent occurrence in the practical use of self-baking electrodes, because, in fact, the cross-sectional area of the structural members is not sufficient to support the electrode current. Typically, an electrode having an outside diameter of 1,000 mm. has a normal current loading of about 50,000 a., and the structural members, being usually made of steel by reason of mechanical stress, would have to be designed by have a total cross-sectional area of about 2,500 cm.[2] if the were to safely support the nominal current loading, thus occupying about one-third of the whole electrode cross section.

In order to minimize the risk of electrode breakages of the type referred to, it is necessary to adjust the electrode length below the contact surface in very small steps, typically some centimeters at a time, in order to ensure that the lower part of the bus bars is always contacting part of the baked zone of the electrode.

Of course, such frequent and small adjustments are very detrimental to efficient operation of the furnace while they do not eliminate totally the risk of electrode breakage.

Moreover, it occurs frequently that the electrode is consumed rapidly which results in a too short overall electrode length for efficient furnace operation, while a length adjustment is not possible by the danger of electrode breakage as described above. In such cases, the lowermost tip of the electrode will be too far away from the crucible bottom, the current transferred thereto by the electrode decreases, thus causing a decrease of the production rate of the furnace.

It is, therefore, an object of the present invention to provide an electrode of the type referred to in which the drawbacks described are substantially eliminated.

With this and other objects in mind, the invention provides in a self-baking electrode for electric arc furnaces, particularly for submerged arc furnaces, said electrode having a metallic sleeve and internal structural member means affixed to said metallic sleeve, the improvement of an electric insulation means insulating the internal structural member means form the metallic sleeve.

In this way, the internal structural members support the weight of the baked portion of the electrode and of the electrode mass overlying it. These structural members being affixed to the sleeve transfer by the electric insulation means the electrode weight to the metallic shell as in the known electrodes, but the insulation means between the structural members and the sleeve prevents in any case the structural supporting member from being electrically overloaded and, consequently, from being overheated to such an extent so as to lose the mechanical characteristics.

In this way the danger of electrode breakage is completely eliminated.

When an electrode is adjusted in length for compensating its wear by consumption, it might occur that the power supplying bus bars are connected to a zone of the electrode which is still a poor electrical conductor: in this case, the internal structural members are not affected because they are protected by their electrical insulation. In the zone of the electrode having a poor electrical conductivity a higher voltage drop occurs than in other zones of the electrode, and, because of this voltage drop and of the current, a considerable quantity of heat is developed causing, in short time, this zone of the electrode contacted by the bus bars to be completely baked. This possibility of rapid baking allows for adjusting more frequently and by longer steps the electrode length and prevents, therefore, the risk of furnace operation with excessively short electrodes, thus allowing a furnace operation at higher power rating.

It has been found, by way of example, that applying the invention to electrodes having a diameter of about 1,000 mm. adjustments in length may be safely carried out twice as frequently and by twice the amount without any risk of electrode breakage.

Moreover, it has been found that with the inventive concept it is possible to considerably decrease (by about half with respect to the conventional electrodes) the total cross-sectional area of the internal structural members, such as of the strips constituting such members: this was to be expected because of the fact that in no case these structural members are subjected to the passage of electric current and are, therefore, in no case overheated to such an extent that their physical strength is diminished.

Accordingly, it has been found, for example, that in an electrode having a diameter of 1,000 mm. it is possible to reduce the number of radial strips forming the internal structural members from eight strips to four without incurring any risk of electrode breakage.

Figure 3:
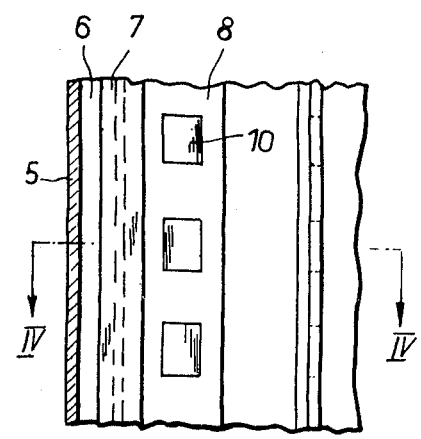
FIG. 3 shows a partial sectional view taken axially along the length of an electrode, the electrode mass having been omitted for clarity, embodying the novel features of the invention.
Figure 4:
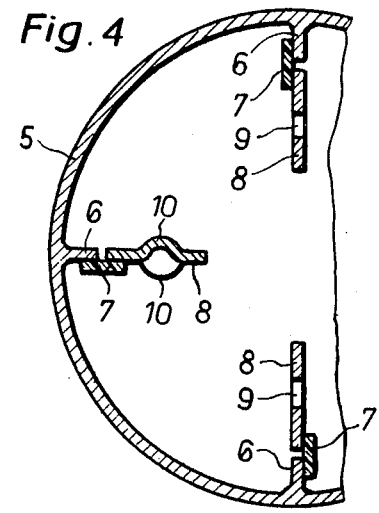
FIG. 4 is a cross-sectional view taken along the line IV–IV of FIG. 3.

An embodiment illustrative for the invention is shown in FIGS. 3 and 4.

In FIGS. 3 and 4 the outer metallic sleeve is indicated by the numeral 5. In the interior of sleeve 5 four radial ribs 6 (only three shown) are attached such as by welding the extend along the whole length of the sleeve 5. To each of these ribs 6 there is affixed a strip 7 of an insulating material such as wood, cardboard, fiber or micanite. These strips may be affixed by any suitable means, such as by bonding with an adhesive.

To each of the strips 7 there is affixed another strip 8, the strips 8 forming the internal structural members.

As in the conventional electrodes, the strips 8 have formed therein apertures 9 (FIG. 4) or beads 10 which serve as anchoring means of the strips 8 in the carbonaceous electrode mass (not shown).

It is understood that instead of four ribs 6 and four strips 8 there may be provided a higher or lower number according to the internal size of the sleeve and/or according to the physical strength of the insulating strips 7 and of the adhesive joints.

Moreover, each of the strips 8 may be affixed to the ribs by means of a pair of insulating strips 7 bonded or glued to either side of the strips 8 and of the ribs 6. The strips 8 may be fastened to the sleeve 5 by means of the profile, such as a T-profile of an electrically insulating material.

Finally, the internal structural members need not necessarily be in the form of s strips 8 as shown. The internal structural members may be formed by a wire mesh either shaped as lengthwise-running ribbons or as concentric inner tube connected with and insulated by any suitable means to the outer metallic sleeve.

What I claim is:

1. A self-baking electrode for electric furnaces comprising a metallic outer sleeve containing an electrode mixture, structural members within said sleeve, and insulating means secured to the inner side of said sleeve and to said structural members for electrically insulating said members from said sleeve.

2. The electrode of claim 1 in which the internal structural members are affixed along their whole length to the outer metallic sleeve.

3. The electrode of claim 2 in which the internal structural members are formed of metallic strips, said strips being disposed inside said sleeve, said insulating means comprises strips of an insulating material and in which said metallic strips are affixed to the outer sleeve by means of said strips of an electrically insulating material.

4. The electrode of claim 3 in which the outer metallic sleeve is a cylinder or prismatic tube carrying said metallic strips, said metallic strips being disposed radially and having affixed thereto said strips of electrically insulating material.

UNITED STATES PATENT OFFICE
CERTIFICATE OF CORRECTION

Patent No. 3,595,977          Dated July 27, 1971

Inventor(s) Bruno Orlando

It is certified that error appears in the above-identified patent and that said Letters Patent are hereby corrected as shown below:

Column 2, line 55 - "50,000 a.," should be --50,000 Amps,--
Column 2, line 59 - "if the were" should be --if they were--.
Column 3, line 12 - "form" should be --from--.
Column 4, line 9 - "welding the extend" should be --welding and extend--.
Column 4, line 27 - "of the profile" should be --of a profile--.
Column 4, line 30 - "of s strips" should be --of strips--.
Column 4, line 52 - Claim 4 - "cylinder" should be --cylindrical--.

Signed and sealed this 7th day of March 1972.

(SEAL)
Attest:

EDWARD M. FLETCHER, JR.
Attesting Officer

ROBERT GOTTSCHALK
Commissioner of Patents